(12) United States Patent
Sasanouchi et al.

(10) Patent No.: US 8,327,722 B2
(45) Date of Patent: Dec. 11, 2012

(54) ROTARY TORQUE DETECTING DEVICE

(75) Inventors: Kiyotaka Sasanouchi, Osaka (JP); Shinji Hirose, Osaka (JP); Kenji Niho, Osaka (JP)

(73) Assignee: Panasonic Corporation, Osaka (JP)

( * ) Notice: Subject to any disclaimer, the term of this patent is extended or adjusted under 35 U.S.C. 154(b) by 242 days.

(21) Appl. No.: 12/849,135

(22) Filed: Aug. 3, 2010

(65) Prior Publication Data

US 2011/0036182 A1 Feb. 17, 2011

(30) Foreign Application Priority Data

Aug. 17, 2009 (JP) ................. 2009-188239
Oct. 21, 2009 (JP) ................. 2009-242013
Nov. 5, 2009 (JP) ................. 2009-253712
May 6, 2010 (JP) ................. 2010-106110

(51) Int. Cl.
*G01L 3/02* (2006.01)
(52) U.S. Cl. ................. 73/862.333
(58) Field of Classification Search ............ 73/862.193, 73/862.331–862.333, 863.325
See application file for complete search history.

(56) References Cited

U.S. PATENT DOCUMENTS

| 7,268,538 B2 * | 9/2007 | Johnson | 324/207.25 |
| 2002/0108454 A1 * | 8/2002 | Nakano et al. | 73/862.333 |
| 2004/0244209 A1 * | 12/2004 | Uehira et al. | 33/1 PT |
| 2011/0219851 A1 * | 9/2011 | Hirose et al. | 73/1.09 |

FOREIGN PATENT DOCUMENTS

JP  2008-082826  4/2008

* cited by examiner

*Primary Examiner* — Max Noori
(74) *Attorney, Agent, or Firm* — Wenderoth, Lind & Ponack, LLP.

(57) ABSTRACT

There is provided a rotary torque detecting device in which a first magnetic body and a second magnetic body are formed in substantially band shapes and third magnetic bodies are formed in substantially rectangular shapes, respectively, by forming the first magnetic body and the second magnetic body in the substantially band shapes and arranging the plurality of substantially rectangular third magnetic bodies at predetermined intervals between the first magnetic body and the second magnetic body, and the magnets. With this structure, in the rotary torque detecting device mainly used for detection of rotary torque of a steering of an automobile, it is possible to reliably detect the rotary torque at low cost.

16 Claims, 18 Drawing Sheets ial shape

ROTARY TORQUE DETECTING DEVICE

BACKGROUND OF THE INVENTION

1. Field of the Invention

The present invention relates to a rotary torque detecting device mainly used for detection of rotary torque of a steering member of an automobile.

2. Description of the Related Art

In recent years, while automobiles are gaining higher functionality, rotary torque and rotation angle of a steering member are detected by using various rotary torque detecting devices and rotation angle detecting devices to carry out various controls of a vehicle such as controls of a power steering device and a brake device.

Such a prior-art rotary torque detecting device will be described with reference to FIGS. 19 and 20. FIG. 19 is a sectional view and FIG. 20 is an exploded perspective view of a prior-art rotary torque detecting device. In these drawings, substantially cylindrical first rotating body 1 rotates in synchronization with a steering member. Substantially arc-shaped magnet 2 has a north pole and a south pole formed to take up an angle of about 20° to 40°. Multiple magnets 2 are secured to a lower end of an outer periphery of first rotating body 1 and first rotating body 1 is covered with substantially cylindrical retaining body 3.

Substantially cylindrical second rotating body 4 is disposed below first rotating body 1. Substantially cylindrical first magnetic body 5 such as a permalloy has multiple protruding portions 5A formed on its inner periphery and second magnetic body 6 similarly has multiple protruding portions 6A on its inner periphery. First magnetic body 5 and second magnetic body 6 face magnets 2 through spacer 7 and are respectively secured to an upper end of substantially cylindrical second rotating body 4.

Multiple wiring patterns (not shown) are formed on upper and lower surfaces of wiring board 8 horizontally disposed beside first rotating body 1 and second rotating body 4. Furthermore, to a surface facing magnets 2, magnetic detecting element 9, such as a Hall element, disposed between first magnetic body 5 and second magnetic body 6 is attached.

On wiring board 8, control means 10 connected to magnetic detecting element 9 is formed of an electronic component such as a microcomputer. Furthermore, between first rotating body 1 and second rotating body 4, substantially columnar connecting body 11 such as a torsion bar having an upper end secured to first rotating body 1 and retaining body 3 and a lower end secured to second rotating body 4 by pins (not shown) is provided.

In substantially box-shaped upper case 12 and lower case 13 made of insulating resin, first rotating body 1, second rotating body 4, first magnetic body 5, second magnetic body 6, wiring board 8, and the like are housed. Furthermore, upper ends of first rotating body 1 and retaining body 3 rotatably protrude through an opening hole in an upper surface of upper case 12 and a lower end of second rotating body 4 rotatably protrudes through an opening hole in a lower surface of lower case 13 to form a rotary torque detecting device.

This rotary torque detecting device is mounted below a steering wheel of an automobile together with a rotation angle detecting device with a steering shaft attached to first rotating body 1 and second rotating body 4. Control means 10 is connected to an electronic circuit (not shown) of an automobile main body via a connector, a lead, and the like (not shown).

In the structure described above, if the steering wheel is turned, first rotating body 1 rotates. After connecting body 11 is twisted, second rotating body 4 rotates after a short lag behind first rotating body 1. At this time, however, the lag in rotation of second rotating body 4 behind first rotating body 1 is short during traveling of a vehicle, because rotary torque is small. The lag in rotation of second rotating body 4 is long during stoppage of the vehicle, because the rotary torque is large.

At this time, the lag in the rotation of second rotating body 4 behind first rotating body 1 is about 1° in terms of angle when the rotary torque is small and is about 4° when the rotary torque is large.

As first rotating body 1 and second rotating body 4 rotate, magnets 2 secured to them rotate and first magnetic body 5 and second magnetic body 6 rotate as well after a short lag. Then, magnetic detecting element 9 detects, through protruding portions 5A and 6A of first magnetic body 5 and second magnetic body 6, changes in magnetism of the north poles and the south poles of magnets 2 formed at predetermined intervals and inputs them to control means 10.

At this time, the magnetism detected by magnetic detecting element 9 is weak when the lag in the rotation of second rotating body 4, to which first magnetic body 5 and second magnetic body 6 are secured, behind first rotating body 1, to which magnets 2 are secured, is short and is strong when the lag in the rotation is long.

Then, control means 10 calculates the rotary torque of the steering member based on an intensity of the magnetism detected by magnetic detecting element 9 through first magnetic body 5 and second magnetic body 6 and outputs it to the electronic circuit of the automobile main body. The electronic circuit computes the rotary torque, the rotation angle of the steering member, or various data from speed sensors and the like attached to respective portions of a vehicle body to carry out various controls of the vehicle such as controls of a power steering device and a brake device.

In other words, if the vehicle is traveling and the rotary torque of the steering member is small, for example, effect of the power steering device is reduced and the steering wheel is turned with some degree of strong force. In other words, during stoppage of the vehicle when the rotary torque of the steering member is large, the effect of the power steering device is enhanced so that the steering wheel can be turned with small force.

As a technique related to the invention of the application, there is that disclosed in Unexamined Japanese Patent Publication No. 2008-82826, for example.

However, to produce each of first magnetic body 5 and second magnetic body 6 by using relatively expensive material such as a permalloy in the prior-art rotary torque detecting device, a central portion is punched first, the entire material is formed into a substantially cylindrical shape by deep drawing or the like, and multiple protruding portions 5A or 6A are formed at the inner periphery. Therefore, the production takes a lot of trouble, yields are low, and the device becomes expensive.

The present invention solves such conventional problems and it is an object thereof to provide a rotary torque detecting device having an inexpensive structure and capable of reliably detecting rotary torque.

SUMMARY OF THE INVENTION

The present invention provides a rotary torque detecting device including: a first rotating body for rotating in synchronization with a steering member; a magnet secured to the first rotating body; a second rotating body disposed below the first rotating body; a first magnetic body and a second magnetic body disposed to face the magnet; a magnetic detecting element disposed between the first magnetic body and the second magnetic body; and a connecting body having an upper end secured to the first rotating body and a lower end secured to the second rotating body. A plurality of substantially rectangular third magnetic bodies are arranged at predetermined intervals between the magnet, and the first magnetic body and the second magnetic body and the first magnetic body and the second magnetic body are formed in substantially band shapes.

With this structure, it is possible to achieve a rotary torque detecting device which can reliably detect rotary torque at low cost.

DETAILED DESCRIPTION OF THE PREFERRED EMBODIMENTS

Figure 1:
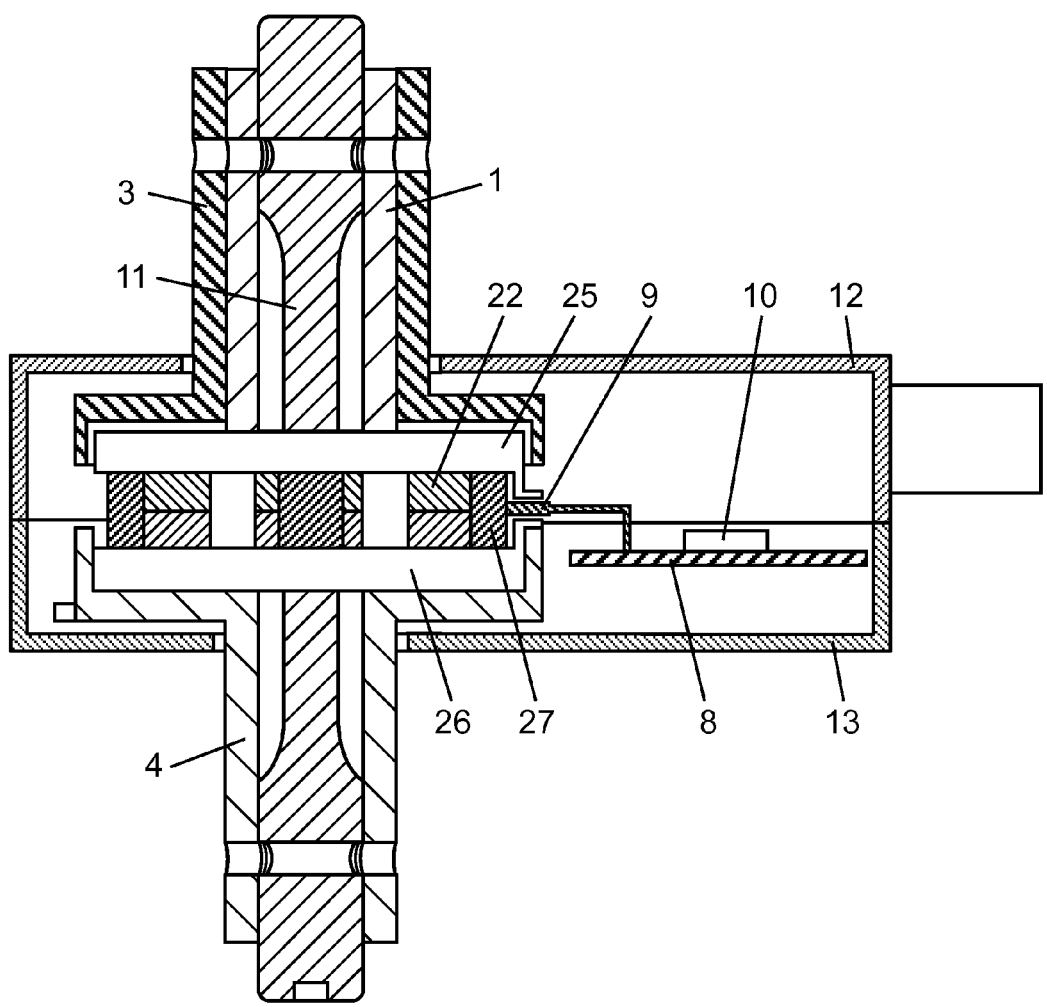
FIG. 1 shows a sectional view of a rotary torque detecting device according to a first embodiment of the present invention.

Embodiments of the present invention will be described below with reference to the drawings. Portions having similar structures to the structures described in the description of the related art will be provided with similar reference numerals to simplify detailed description.

First Embodiment

A first embodiment of the present invention will be described with reference to FIGS. 1 to 8. FIG. 1 is a sectional view of a rotary torque detecting device according to the first embodiment of the present invention.

Figure 2:
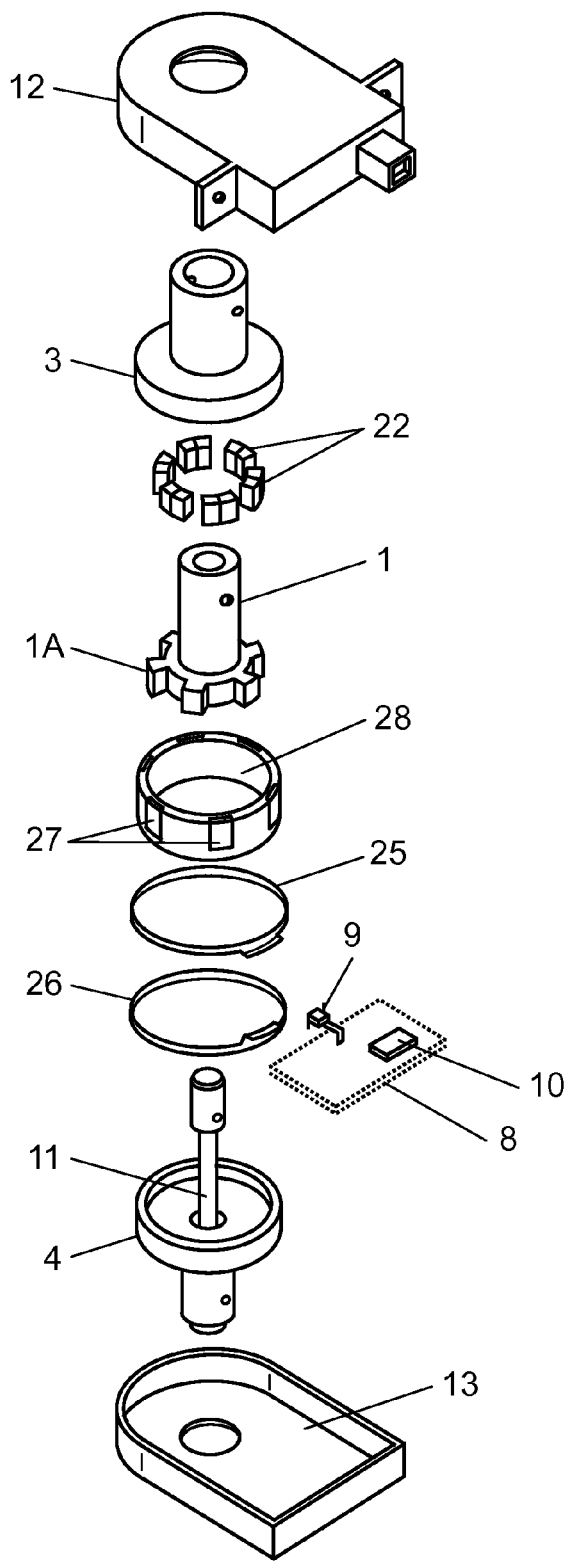
FIG. 2 shows an exploded perspective view of the rotary torque detecting device according to the first embodiment of the present invention.

FIG. 2 is an exploded perspective view of the same. In these drawings, first rotating body 1 made of insulating resin such as polybutylene terephthalate is in a substantially cylindrical shape and rotates in synchronization with a steering member. Magnet 22 is in a substantially arc shape and made of ferrite, an Nd—Fe—B alloy, or the like and retaining body 3 is in a substantially cylindrical shape and made of insulating resin such as polybutylene terephthalate. Multiple magnets 22 are secured at predetermined intervals to flange portion 1A at a lower end of an outer periphery of first rotating body 1 and first rotating body 1 is covered with retaining body 3.

Figure 3:
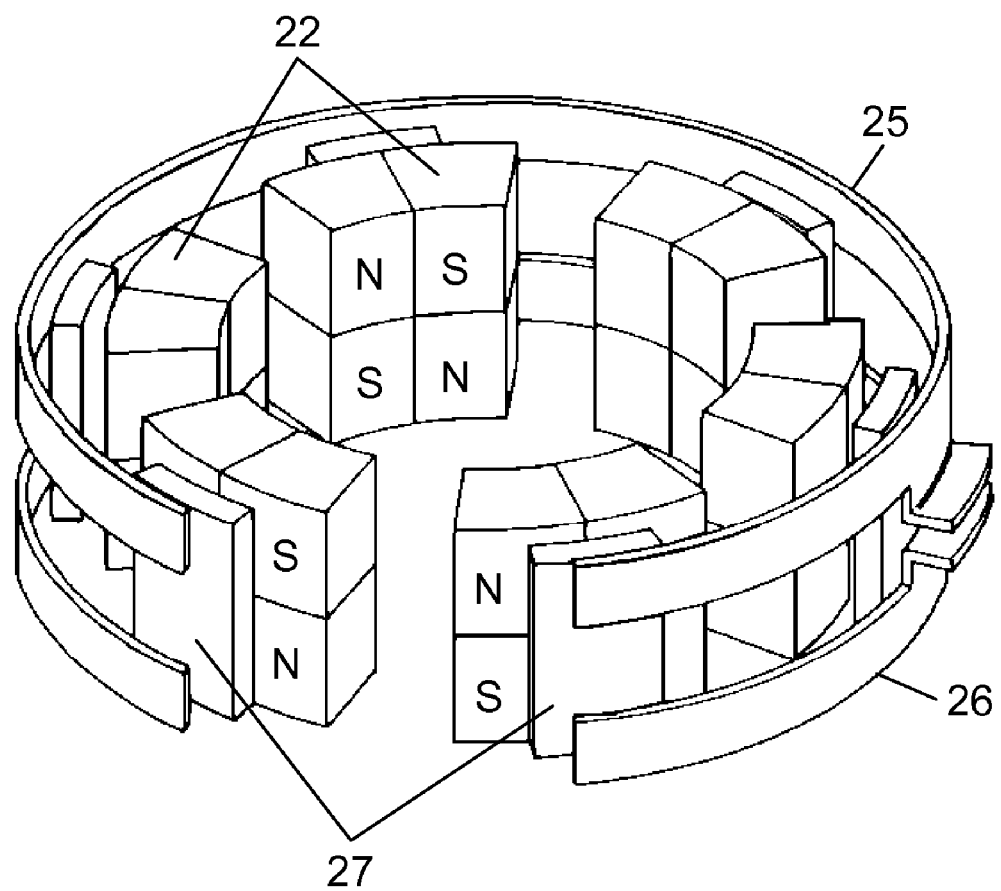
FIG. 3 shows a partial perspective view of the rotary torque detecting device according to the first embodiment of the present invention.

In this substantially arc-shaped magnet 22, different magnetic poles, i.e., a north pole and a south pole are formed to be adjacent to each other in each of vertical and lateral directions as shown in a partial perspective view in FIG. 3. At the same time, six to ten magnets 22 are arranged radially at predetermined angular intervals (e.g., at intervals of 60° in a case of six magnets) at flange portion 1A.

If magnet 22 has a width corresponding to an angle of 40° and each of multiple protruding portions of flange portion 1A has a width corresponding to an angle of 20° with respect to a center of rotation of first rotating body 1 and six magnets 22 are arranged at intervals of 60°, for example, multiple magnets 22 make up only two-thirds of the entire volume. In other words, volume of magnets 22 reduces by volume of the protruding portions of flange portion 1A and it is possible to reduce a used amount of magnet 22.

Second rotating body 4 is in a substantially cylindrical shape and made of insulating resin such as polybutylene terephthalate and first magnetic body 25 is made of a permalloy, iron, an Ni—Fe alloy, or the like. Second rotating body 4 is disposed below first rotating body 1 and first magnetic body 25 and second magnetic body 26 are formed by winding substantially band-shaped plate materials into ring shapes.

Third magnetic body 27 is made of a permalloy, iron, an Ni—Fe alloy, or the like. Substantially rectangular multiple third magnetic bodies 27 are arranged radially at predetermined angular intervals, e.g., six third magnetic bodies 27 are arranged at intervals of 60° by insert molding, press fitting, or the like in substantially cylindrical base body 28 made of insulating resin such as polybutylene terephthalate.

Third magnetic bodies 27 are disposed between magnet 22, and first magnetic body 25 and second magnetic body 26. At the same time, third magnetic bodies 27 are secured to an upper end of second rotating body 4 and first magnetic body 25 and second magnetic body 26 are respectively disposed above second rotating body 4 while facing magnets 22 through multiple third magnetic bodies 27.

Multiple wiring patterns (not shown) are made of copper foil or the like on upper and lower surfaces of wiring board 8 made of paper phenol, glass-containing epoxy, or the like and wiring board 8 is disposed horizontally beside first rotating body 1 and second rotating body 4. On a surface facing magnets 22, magnetic detecting element 9 such as a Hall element for detecting vertical magnetism or a GMR element for detecting horizontal magnetism disposed between first magnetic body 25 and second magnetic body 26 is implemented.

On wiring board 8, control means 10 connected to magnetic detecting element 9 is formed of an electronic component such as a microcomputer. Furthermore, between first rotating body 1 and second rotating body 4, substantially columnar connecting body 11 such as a torsion bar made of steel or the like and having an upper end secured to first rotating body 1 and retaining body 3 and a lower end secured to second rotating body 4 by pins (not shown) is provided.

In substantially box-shaped upper case 12 and lower case 13 made of insulating resin such as polybutylene terephthalate, first rotating body 1, second rotating body 4, first magnetic body 25, second magnetic body 26, wiring board 8, and the like are housed. Furthermore, upper ends of first rotating body 1 and retaining body 3 rotatably protrude through an opening hole in an upper surface of upper case 12 and a lower end of second rotating body 4 rotatably protrudes through an opening hole in a lower surface of lower case 13 to form a rotary torque detecting device. For first magnetic body 25, second magnetic body 26, and third magnetic body 27 of the above-described rotary torque detecting device, relatively expensive material such as the permalloy is used. However, first magnetic body 25 and second magnetic body 26, for example, are formed in substantially band shapes as shown in FIGS. 2 and 3 and therefore can be produced in a short time with high yields by cutting a plate material of predetermined dimensions into a plurality of substantially band shapes and then winding them into ring shapes by bending.

Moreover, multiple third magnetic bodies 27 are also formed in substantially rectangular shapes and therefore can also be produced in a short time with high yields by cutting a plate material of predetermined dimensions into a plurality of substantially rectangular shapes, forming them into substantially arc shapes by bending, and radially arranging them at the predetermined angular intervals in base body 28 by insert molding, press fitting, or the like.

In other words, by forming first magnetic body 25 and second magnetic body 26 into the substantially band shapes and forming third magnetic bodies 27 disposed at predetermined intervals between first magnetic body 25 and second magnetic body 26, and magnets 22 into the substantially rectangular shapes, it is possible to make them with high yields and at low cost from the plate materials of predetermined dimensions by cutting or bending.

This rotary torque detecting device is mounted below a steering wheel of an automobile together with a rotation angle detecting device and the like with a steering shaft attached to first rotating body 1 and second rotating body 4. At the same time, control means 10 is connected to an electronic circuit (not shown) of an automobile main body via a connector, a lead, and the like (not shown).

In the structure described above, if the steering wheel is turned, first rotating body 1 rotates. After connecting body 11 is twisted, second rotating body 4 rotates after a short lag behind first rotating body 1. At this time, however, the lag in rotation of second rotating body 4 behind first rotating body 1 is short during traveling of a vehicle, because rotary torque is small. The lag in rotation of second rotating body 4 is long during stoppage of the vehicle, because the rotary torque is large.

As first rotating body 1 rotates, multiple magnets 22 secured to it rotate, second rotating body 4 rotates as well after a short lag, magnetic detecting element 9 detects, through first magnetic body 25 and second magnetic body 26, magnetism of magnets 22 and inputs it to control means 10.

Figure 4A:
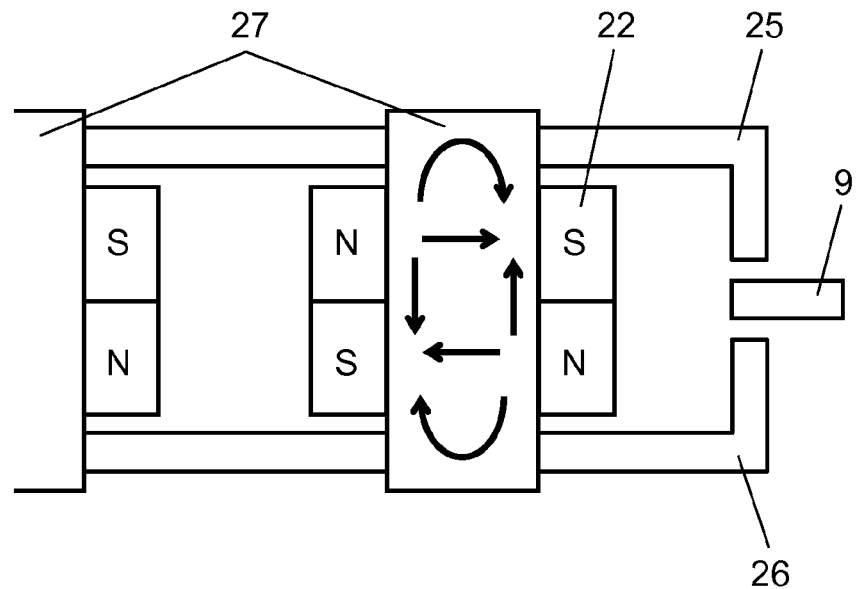
FIG. 4A shows a partial side view of the rotary torque detecting device according to the first embodiment of the present invention.

In other words, when the steering wheel is not turned and is in a neutral position and the vehicle is in a straight traveling state, a center of each of multiple third magnetic bodies 27 arranged between magnets 22, and first magnetic body 25 and second magnetic body 26 is at a center of magnet 22 in which different magnetic poles, i.e., the north pole and the south pole are adjacent to each other in each of vertical and lateral directions and therefore magnetic forces from the north poles to the south poles are balanced, respectively, as shown in a partial side view in FIG. 4A, for example.

As a result, no magnetic flux is generated between first magnetic body 25 and second magnetic body 26 outside multiple third magnetic bodies 27 and therefore the magnetism detected by magnetic detecting element 9 disposed therebetween is zero.

Figure 4B:
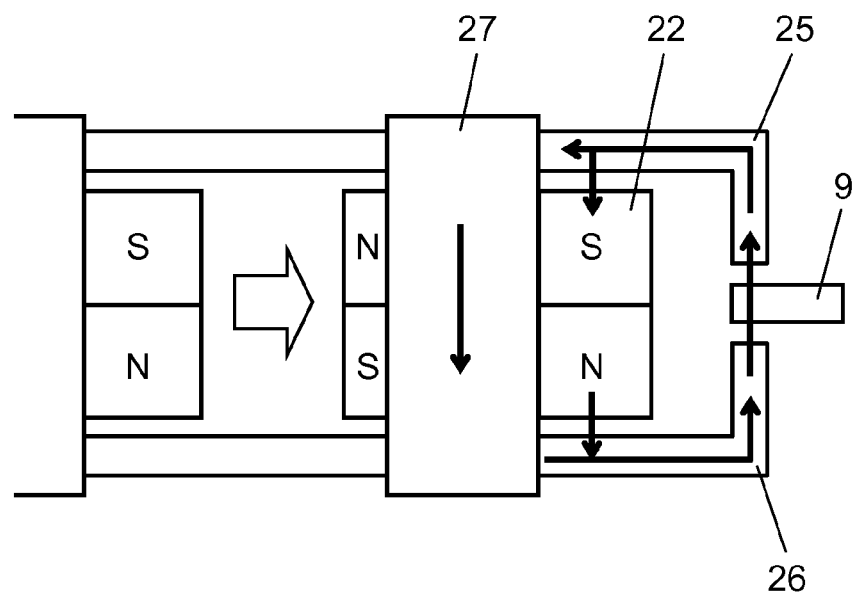
FIG. 4B shows a partial side view of the rotary torque detecting device according to the first embodiment of the present invention.
Figure 5:
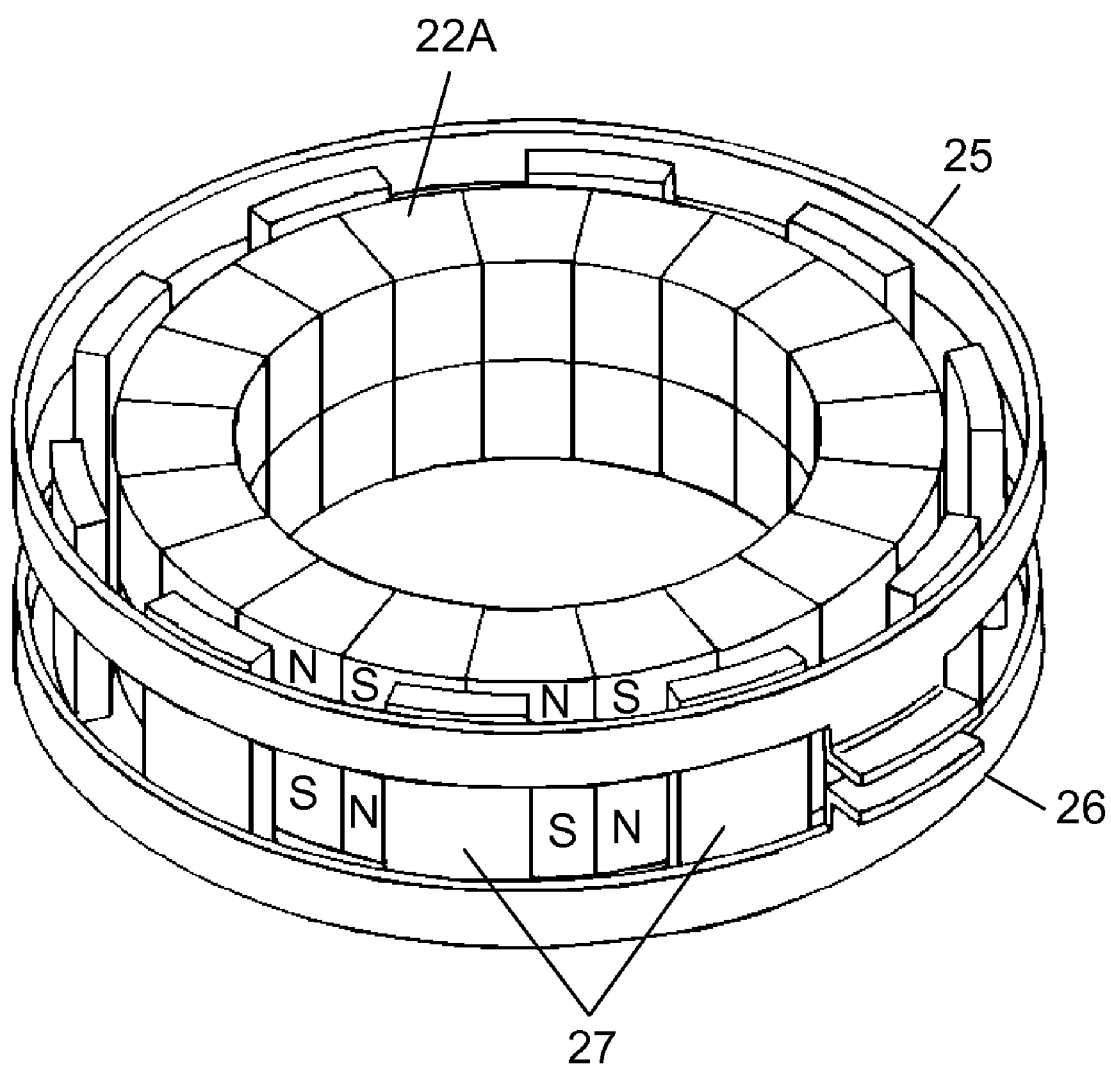
FIG. 5 shows a partial perspective view of the rotary torque detecting device according to the first embodiment of the present invention.

On the other hand, when the steering wheel is turned rightward or leftward and magnets 22 rotate when the center of third magnetic body 27 is displaced from magnet 22 as shown in FIG. 4B, for example, a magnetic flux which is a closed magnetic path from the north pole to the south pole is generated in third magnetic body 27 by magnet 22.

Simultaneously, a magnetic flux from the north pole to the south pole is generated in first magnetic body 25 and second magnetic body 26 by magnet 22 and magnetic detecting element 9 detects the magnetism and outputs voltage corresponding to an intensity of the magnetism to control means 10.

At this time, the lag in the rotation of second rotating body 4 behind first rotating body 1 is about 1° in terms of angle when the rotary torque is small and is about 4° when the rotary torque is large. Furthermore, the magnetism detected by magnetic detecting element 9 is weak when the lag in the rotation of second rotating body 4, to which third magnetic bodies 27 are secured, behind first rotating body 1, to which magnets 22 are secured, is short and is strong when the lag in the rotation is long.

Then, control means 10 calculates the rotary torque of the steering shaft based on the intensity of the magnetism detected by magnetic detecting element 9 through first magnetic body 25, second magnetic body 26, and third magnetic body 27 and outputs it to the electronic circuit of the automobile main body. The electronic circuit computes the rotary torque, the rotation angle of the steering member, or various data from speed sensors and the like attached to respective portions of a vehicle body to carry out various controls of the vehicle such as controls of a power steering device and a brake device.

In other words, adjusting to a state of traveling or stoppage of the vehicle, if the vehicle is traveling and the rotary torque of the steering member is small, for example, effect of the power steering device is reduced and the steering wheel is turned with some degree of strong force. In other words, during stoppage of the vehicle when the rotary torque of the steering member is large, the effect of the power steering device is enhanced so that the steering wheel can be turned with small force.

At this time, as described above, by forming first magnetic body 25 and second magnetic body 26 into the substantially band shapes and arranging substantially rectangular multiple third magnetic bodies 27 between first magnetic body 25 and second magnetic body 26, and magnets 22 at predetermined intervals, first magnetic body 25 and second magnetic body 26 are formed in the substantially band shapes and third magnetic bodies 27 are formed in the substantially rectangular shapes and therefore it is possible to make them in a short time, with high yields, and at low cost from the plate materials of predetermined dimensions by cutting or bending.

Because magnetic detecting element 9 detects the magnetism of magnets 22 through first magnetic body 25, second magnetic body 26, and third magnetic body 27 and control means 10 detects the rotary torque based on this detection, it is possible to reliably detect the rotary torque with an inexpensive structure.

In the structure described in the above description, multiple magnets 22, in each of which the different magnetic poles, i.e., the north pole and the south pole are adjacent to each other in each of the vertical and lateral directions, are radially arranged at the predetermined intervals at flange portion 1A at the lower portion of the outer periphery of first rotating body 1. However, the present invention can be carried out, if substantially ring-shaped magnet 22A, in which different magnetic poles, i.e., north poles and south poles are arranged continuously and alternately to be adjacent to each other in vertical and lateral directions, is used and third magnetic bodies 27, first magnetic body 25, and second magnetic body 26 are disposed outside magnet 22A as shown in a partial perspective view in FIG. 5, though volume of magnet 22 slightly increases and a used amount of magnet 22 increases.

Figure 6A:
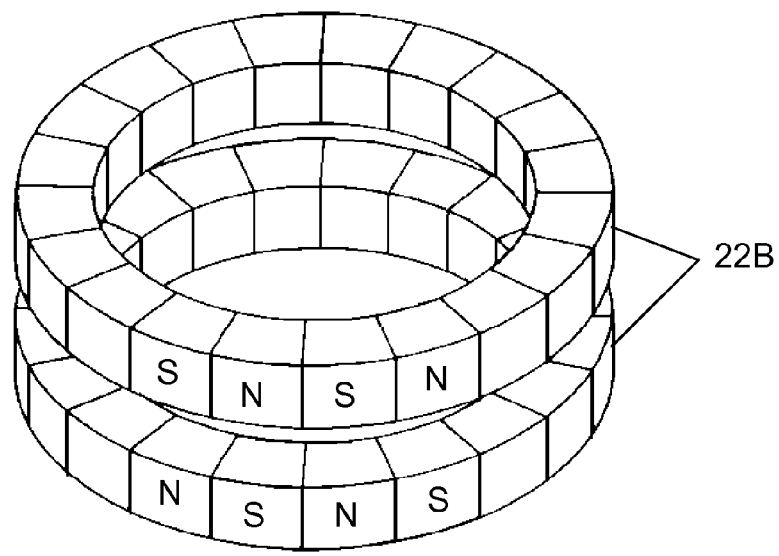
FIG. 6A shows a partial perspective view of the rotary torque detecting device according to the first embodiment of the present invention.
Figure 6B:
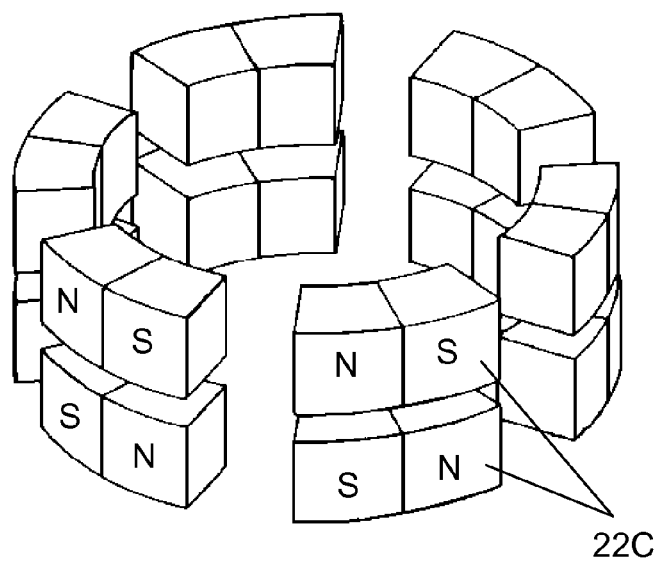
FIG. 6B shows a partial perspective view of the rotary torque detecting device according to the first embodiment of the present invention.

As shown in a partial perspective view in FIG. 6A, two substantially ring-shaped magnets 22B, in each of which different magnetic poles, i.e., north poles and south poles are formed continuously and alternately to be adjacent to each other in a lateral direction, may be placed on each other. As shown in FIG. 6B, two substantially arc-shaped magnets 22C, in each of which a north pole and a south pole are formed to be adjacent to each other in a lateral direction, may be placed on each other and the pairs may be radially arranged at predetermined intervals. Alternatively, two magnets, in each of which a north pole and a south pole are formed to be adjacent to each other in a vertical direction, may be arranged in a lateral direction.

Figure 7:
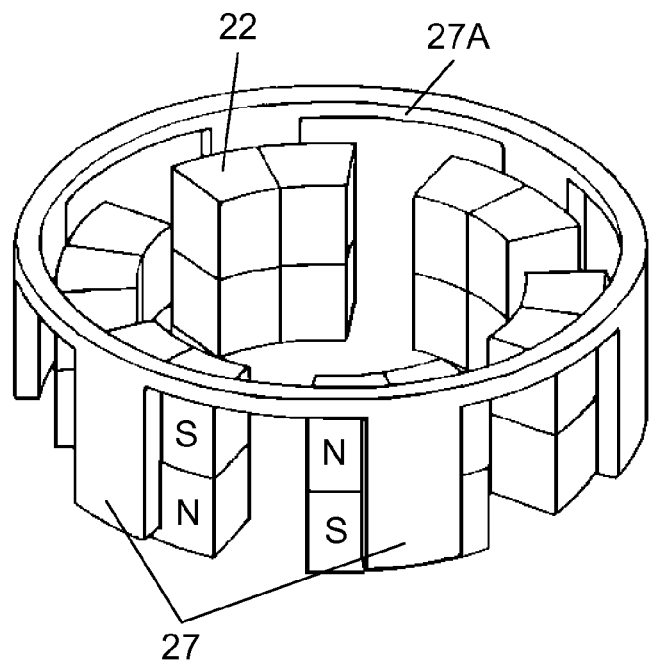
FIG. 7 shows a partial perspective view of the rotary torque detecting device according to the first embodiment of the present invention.

Although multiple substantially rectangular third magnetic bodies 27 are radially arranged at predetermined intervals in base body 28 by insert molding, press fitting, or the like in the structure described in the above description, the present invention can be carried out, if multiple third magnetic bodies 27 are connected by frame portion 27A and multiple third magnetic bodies 27 are formed integrally as shown in a partial perspective view in FIG. 7.

Figure 8:
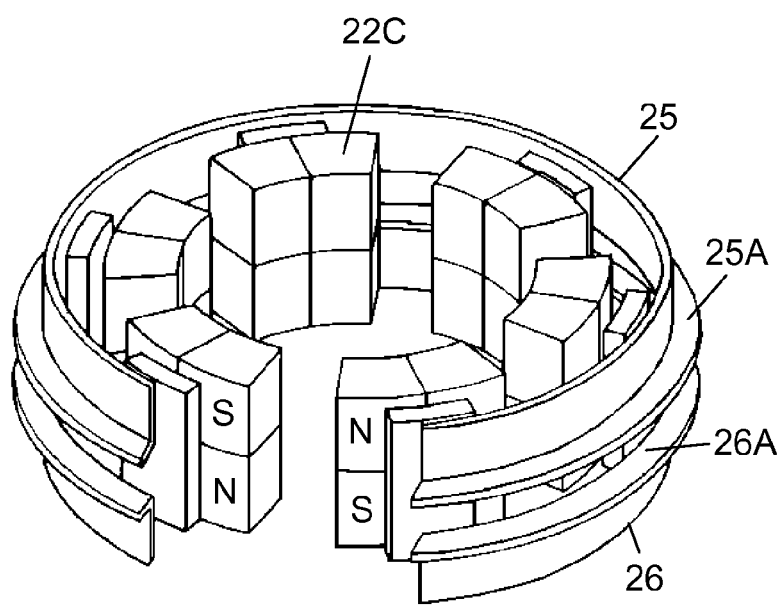
FIG. 8 shows a partial perspective view of the rotary torque detecting device according to the first embodiment of the present invention.

As shown in a partial perspective view in FIG. 8, flange portions 25A and 26A may be provided at an outer periphery of a lower end of first magnetic body 25 and an outer periphery of an upper end of second magnetic body 26 and magnetic detecting element 9 may be disposed between them, and first magnetic body 25, second magnetic body 26, and third magnetic bodies 27 may be respectively secured to an upper end of second rotating body 4.

As described above, according to the first embodiment, first magnetic body 25 and second magnetic body 26 are formed in substantially band shapes (annular) and substantially rectangular multiple third magnetic bodies 27 are arranged at the predetermined intervals between first magnetic body 25 and second magnetic body 26, and magnets 22. Because first magnetic body 25 and second magnetic body 26 are formed in substantially band shapes and third magnetic bodies 27 are formed in substantially rectangular shapes, they can be produced with high yields by cutting, bending, or the like. Furthermore, by detecting the magnetism of magnets 22 through these respective magnetic bodies, it is possible to obtain the rotary torque detecting device that can reliably detect the rotary torque with the inexpensive structure.

Second Embodiment

A second embodiment of the present invention will be described with reference to FIGS. 9 to 13. Portions having similar structures to the structures described in the first embodiment will be provided with similar reference numerals to omit detailed description.

Figure 9:
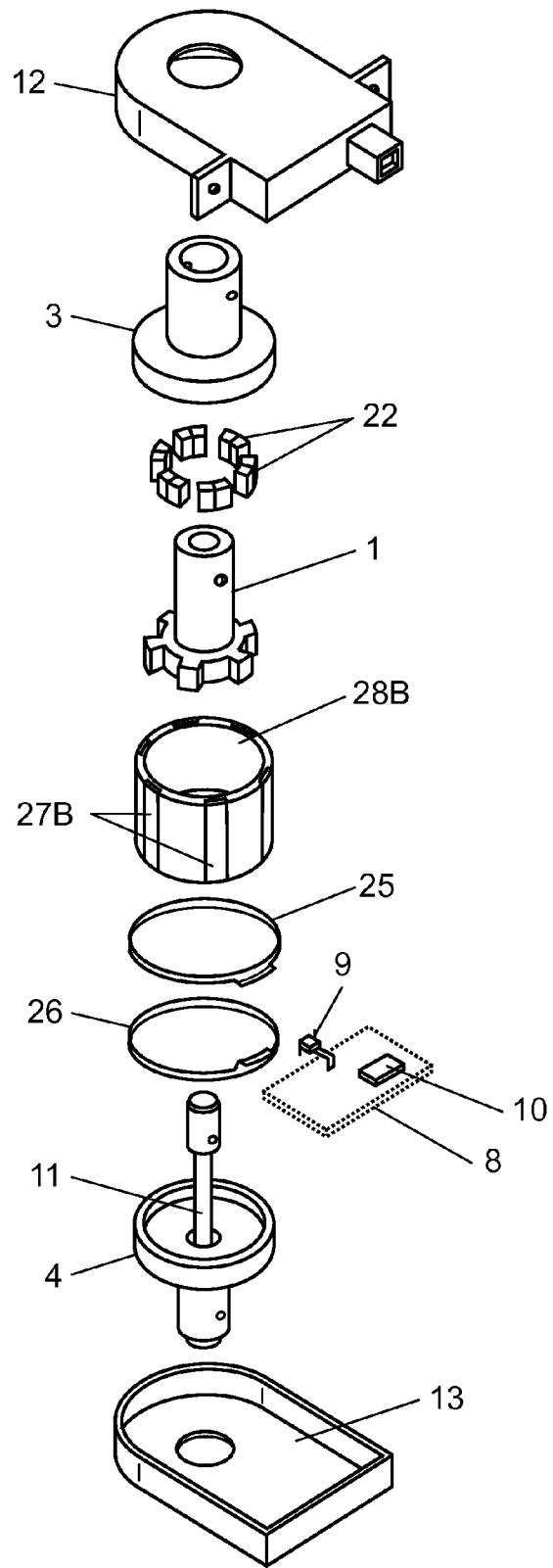
FIG. 9 shows an exploded perspective view of a rotary torque detecting device according to a second embodiment of the present invention.
Figure 10:
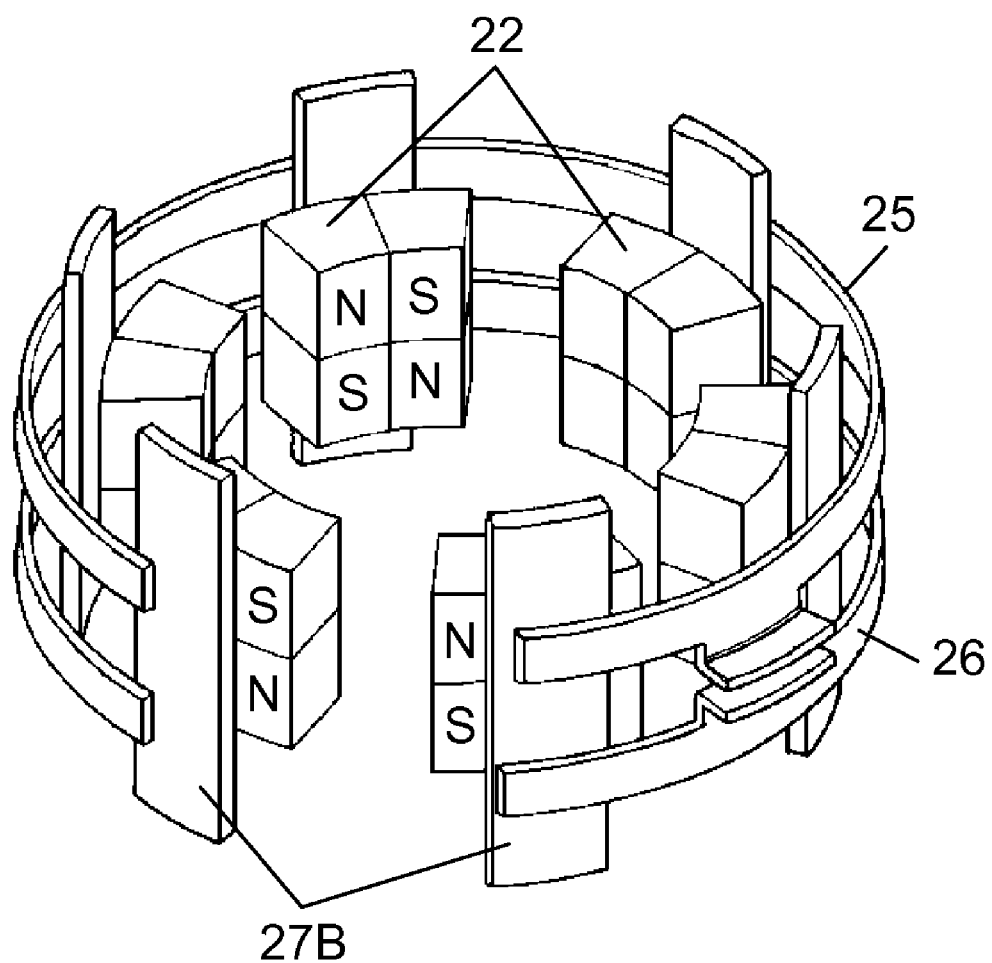
FIG. 10 shows a partial perspective view of the rotary torque detecting device according to the second embodiment of the present invention.

FIG. 9 is an exploded perspective view of a rotary torque detecting device according to the second embodiment of the present invention. FIG. 10 is a partial perspective view of the same. In these drawings, the device is the same as that in the first embodiment in that first magnetic body 25 and second magnetic body 26 are formed in substantially band shapes (annular shapes) and multiple third magnetic bodies 27B arranged at predetermined intervals between first magnetic body 25 and second magnetic body 26, and magnets 22 are formed in substantially rectangular shapes.

The device is the same as that in the first embodiment in that magnetic detecting element 9 and control means 10 are implemented on wiring board 8 disposed on one side and that connecting body 11 has an upper end secured to first rotating body 1 and retaining body 3 and a lower end secured to second rotating body 4. However, by forming substantially rectangular third magnetic bodies 27B and base body 28B in which third magnetic bodies 27B are arranged so that they protrude upward or downward from magnets 22, it is possible to prevent adhesion of foreign matter such as iron dust entering from outside to magnets 22.

In other words, in third magnetic body 27B, magnetism is constantly generated whether a center of third magnetic body 27B is at a center of magnet 22 in a neutral position or is displaced from magnet 22 unlike first magnetic body 25 and second magnetic body 26 as described in the first embodiment. Therefore, if the foreign matter such as iron dust enters through gaps and the like in upper case 12 and lower case 13, it adheres to upper ends or lower ends of third magnetic bodies 27B protruding upward or downward from magnets 22 before adhering to magnets 22.

In other words, by forming third magnetic bodies 27B which are constantly magnetized so that they protrude upward or downward from magnets 22, it is possible to prevent changes in distances from magnets 22 to third magnetic bodies 27B, first magnetic body 25, and second magnetic body 26, a short circuit, and the like due to the adhesion of the iron dust and the like to magnets 22 to thereby stably detect the magnetism with magnetic detecting element 9 without errors and variations.

In the structures described in the above description, third magnetic bodies 27 or 27B arranged perpendicularly in the vertical direction are disposed to face multiple magnets 22 in each of which different magnetic poles, i.e., the north pole and the south pole are formed to be adjacent to each other in each of the vertical and lateral directions. However, the present invention can be carried out, if substantially ring-shaped magnet 22D, in which different magnetic poles, i.e., north poles and south poles are formed continuously and alternately to be inclined and adjacent to each other in the lateral direction, is used and multiple third magnetic bodies 27B are disposed to face magnet 22D as shown in a partial side view in FIG. 11A.

Figure 11A:
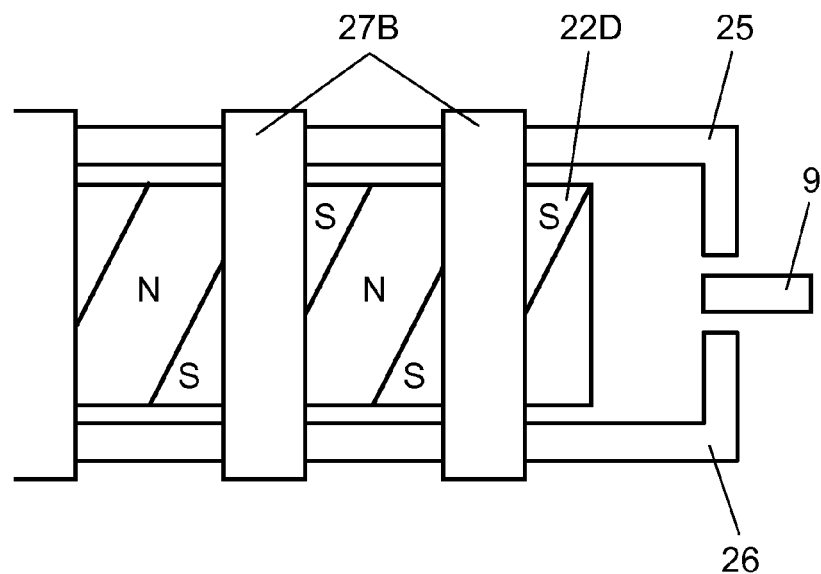
FIG. 11A shows a partial side view of the rotary torque detecting device according to the second embodiment of the present invention.
Figure 11B:
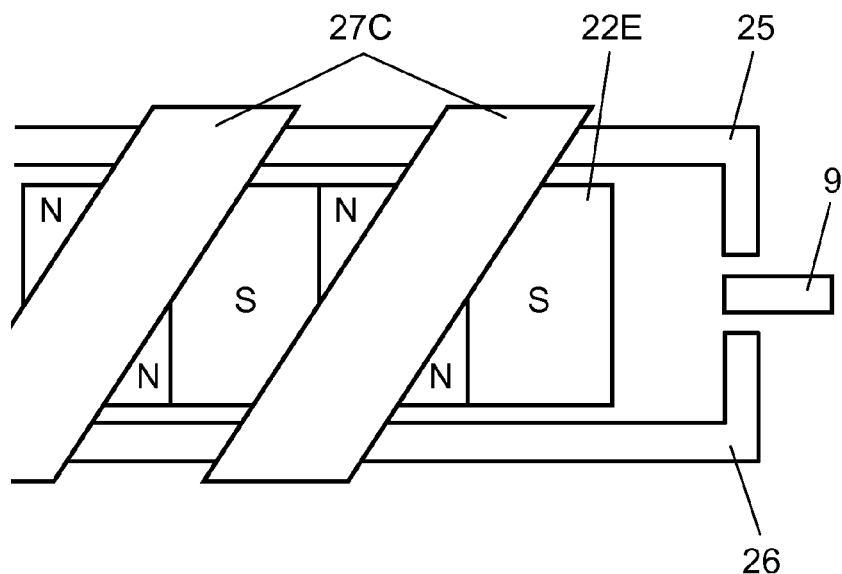
FIG. 11B shows a partial side view of the rotary torque detecting device according to the second embodiment of the present invention.

By contrast, as shown in FIG. 11B, substantially ring-shaped magnet 22E, in which different magnetic poles, i.e., north poles and south poles are formed continuously, alternately, and perpendicularly in the vertical direction to be adjacent to each other in the lateral direction, may be used and multiple inclined third magnetic bodies 27C may be disposed to face magnet 22E.

FIGS. 11A and 11B show a state in which a steering wheel is not turned and is in a neutral position and magnetic forces in magnet 22D or 22E are balanced. In other words, no magnetic flux is generated between first magnetic body 25 and second magnetic body 26 outside third magnetic bodies 27B or 27C and therefore magnetism detected by magnetic detecting element 9 disposed between them is zero.

If the steering wheel is turned rightward or leftward from this state and third magnetic bodies 27B or 27C rotate after a short lag behind rotation of magnet 22D or 22E, magnetic fluxes are generated in first magnetic body 25 and second magnetic body 26 and magnetic detecting element 9 detects the magnetism and outputs voltage according to an intensity of the magnetism to control means 10 similarly to the first embodiment.

Figure 12A:
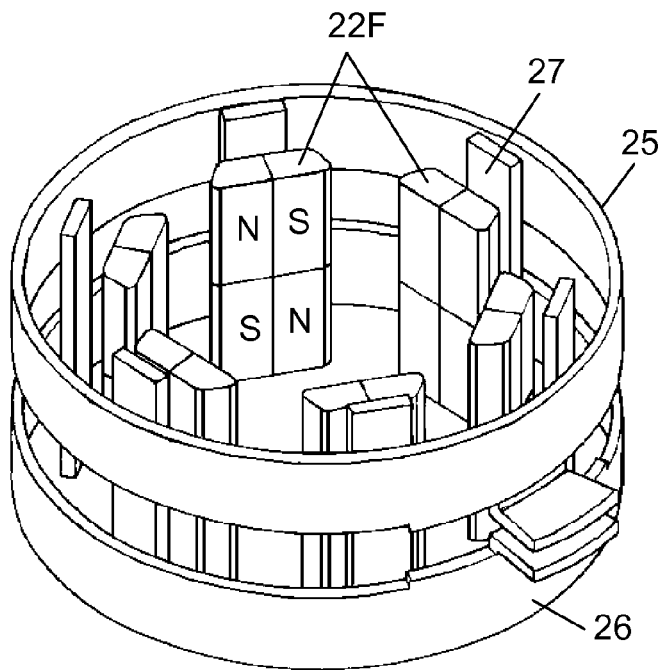
FIG. 12A shows a partial perspective view of the rotary torque detecting device according to the second embodiment of the present invention.
Figure 12B:
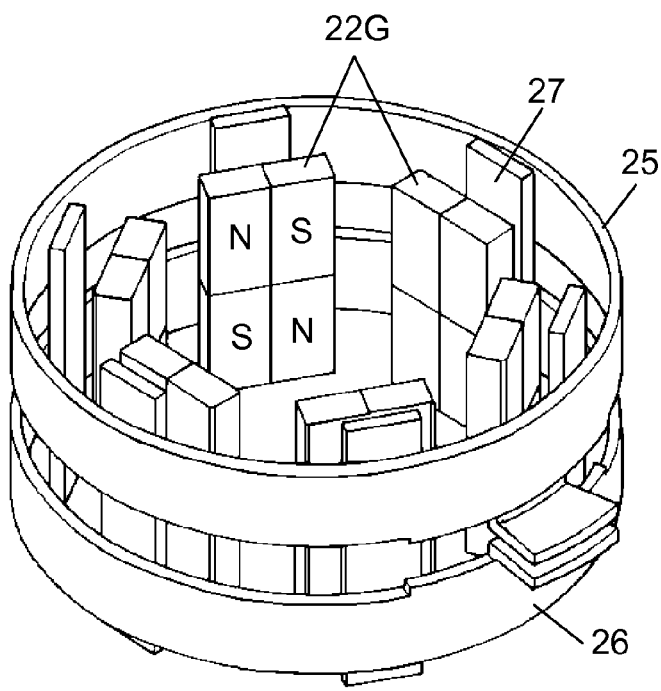
FIG. 12B shows a partial perspective view of the rotary torque detecting device according to the second embodiment of the present invention.

Although substantially arc-shaped magnets 22 or substantially ring-shaped magnet 22D are (is) used and third magnetic bodies 27 or 27B are disposed to face the magnet(s) in the structure described in the above description, it is possible to form magnets 22F or 22G at relatively low cost by using magnets 22F substantially in shapes of trapezoidal prisms as shown in a partial perspective view in FIG. 12A or magnets 22G substantially in shapes of rectangular prisms as shown in FIG. 12B.

Figure 13:
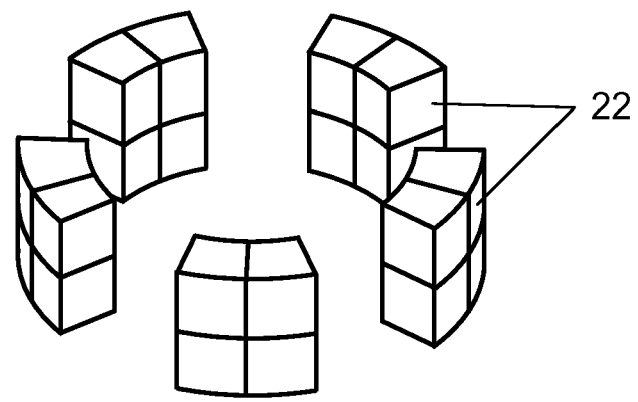
FIG. 13 shows a partial exploded perspective view of the rotary torque detecting device according to the second embodiment of the present invention.
Figure 13:
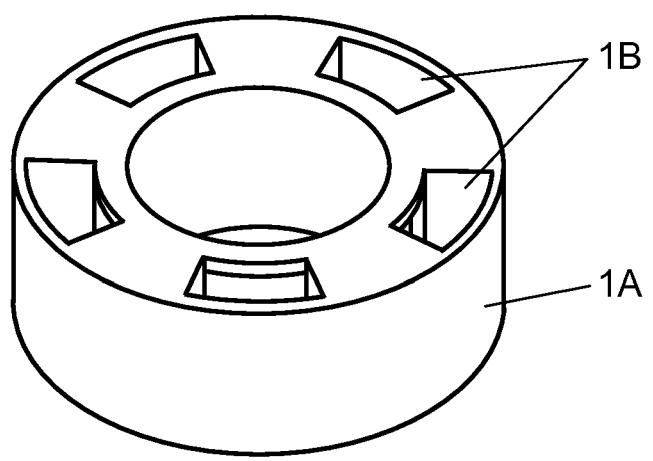
Figure 13:
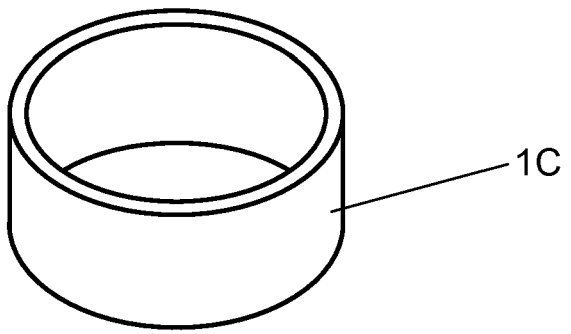

Furthermore, as shown in a partial exploded perspective view in FIG. 13, by forming multiple recessed portions 1B at predetermined intervals in flange portion 1A at a lower end of an outer periphery of first rotating body 1, providing substantially cylindrical support body 1C made of iron or the like at an inner periphery of recessed portions 1B by insert molding or the like, inserting multiple magnets 22 into recessed portions 1B, and temporarily joining inner peripheries of magnets 22 to support body 1C by magnetic forces, it is possible to secure magnets 22 to first rotating body 1 at accurate intervals without backlash and inclination in securing magnets 22 to first rotating body 1 after applying an adhesive or the like into recessed portions 1B.

As described above, the present invention can be carried out with one magnetic detecting element 9 disposed between first magnetic body 25 and second magnetic body 26. However, by providing two magnetic detecting elements 9, for example, and detecting the magnetism of magnets 22 or the like with multiple magnetic detecting elements 9, the rotary torque can be detected in the event of breakage or failure of one of magnetic detecting elements 9. If control means 10 carries out comparison of the magnetism detected by them, it is possible to detect such breakage and failure.

As described above, according to the second embodiment of the present invention, by forming first magnetic body 25 and second magnetic body 26 into substantially band shapes and forming multiple third magnetic bodies 27B arranged between first magnetic body 25 and second magnetic body 26, and magnets 22 into substantially rectangular shapes, it is possible to reliably detect the rotary torque with the inexpensive structure. At the same time, by forming third magnetic bodies 27B so that they protrude upward or downward from magnets 22, adhesion of the foreign matter such as the iron dust to magnets 22 can be prevented and changes in the gaps between magnets 22 and the respective magnetic bodies and the short circuit due to the iron dust and the like can be prevented and therefore it is possible to stably detect the magnetism with magnetic detecting element 9 without errors and variations.

Third Embodiment

A third embodiment of the present invention will be described with reference to FIGS. 14 to 18B. Portions having similar structures to the structures in the first embodiment will be provided with similar reference numerals to omit detailed description.

Figure 14:
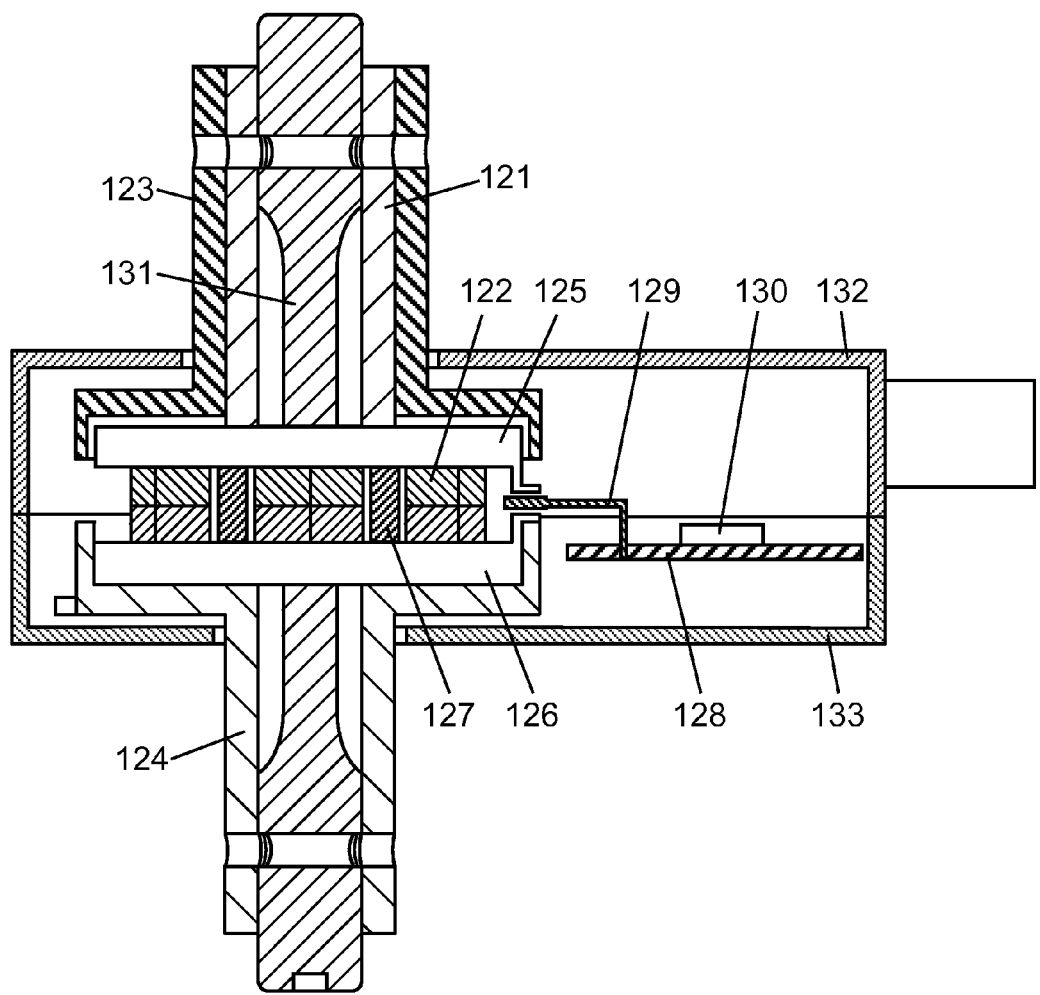
FIG. 14 shows a sectional view of a rotary torque detecting device according to a third embodiment of the present invention.
Figure 15:
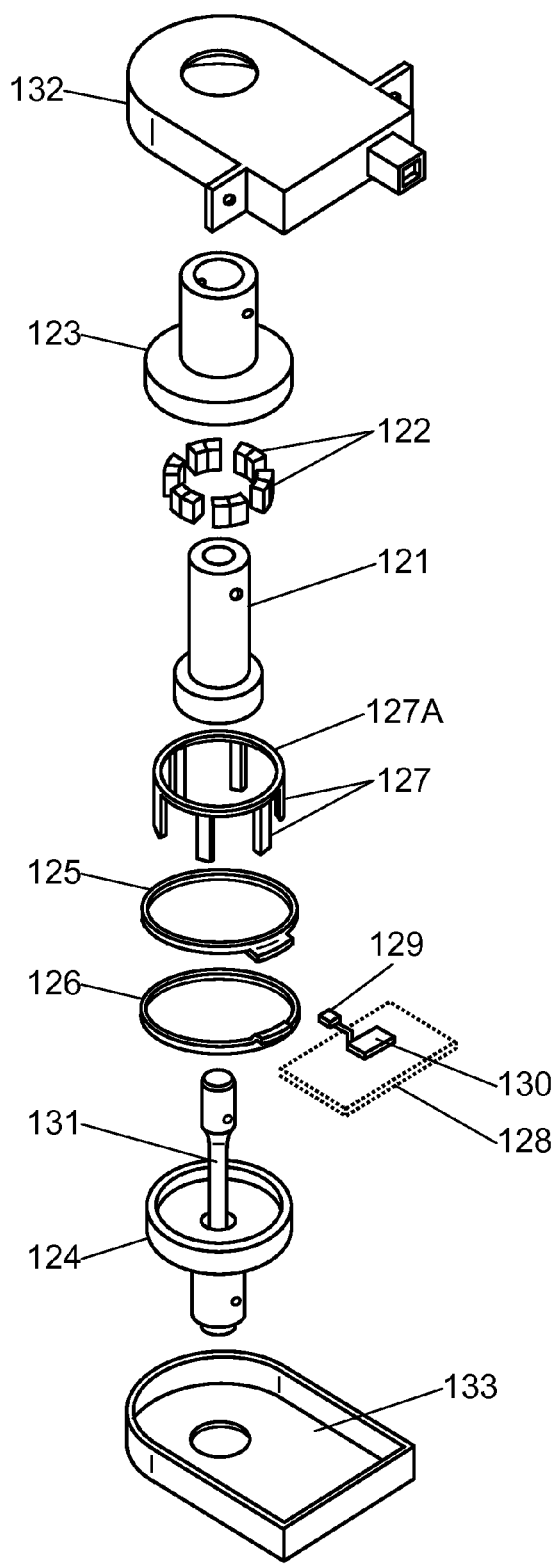
FIG. 15 shows an exploded perspective view of the rotary torque detecting device according to the third embodiment of the present invention.

FIG. 14 is a sectional view of a rotary torque detecting device according to the third embodiment of the present invention. FIG. 15 is an exploded perspective view of the same. In these drawings, first rotating body 121 made of insulating resin such as polybutylene terephthalate is in a substantially cylindrical shape and rotates in synchronization with a steering member. Magnet 122 is in a substantially arc shape and made of ferrite, an Nd—Fe—B alloy, or the like and retaining body 123 is in a substantially cylindrical shape and made of insulating resin such as polybutylene terephthalate. Multiple magnets 122 are secured at predetermined intervals to a lower end of an outer periphery of first rotating body 121 and first rotating body 121 is covered with retaining body 123.

Figure 16:
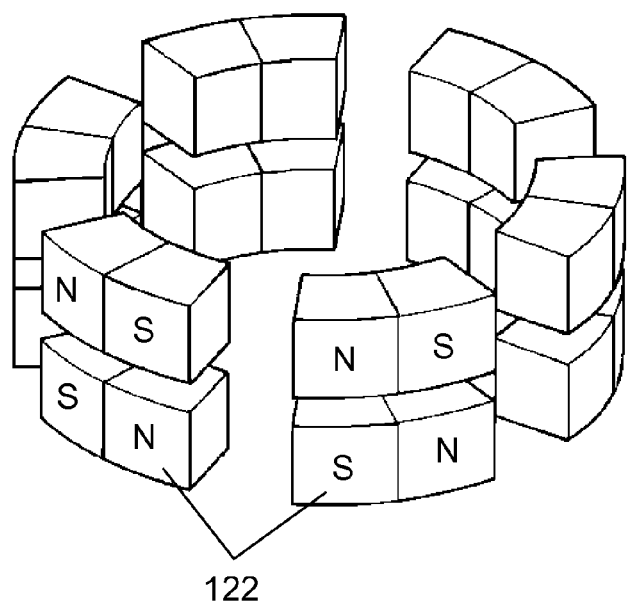
FIG. 16 shows a partial perspective view of the rotary torque detecting device according to the third embodiment of the present invention.
Figure 17:
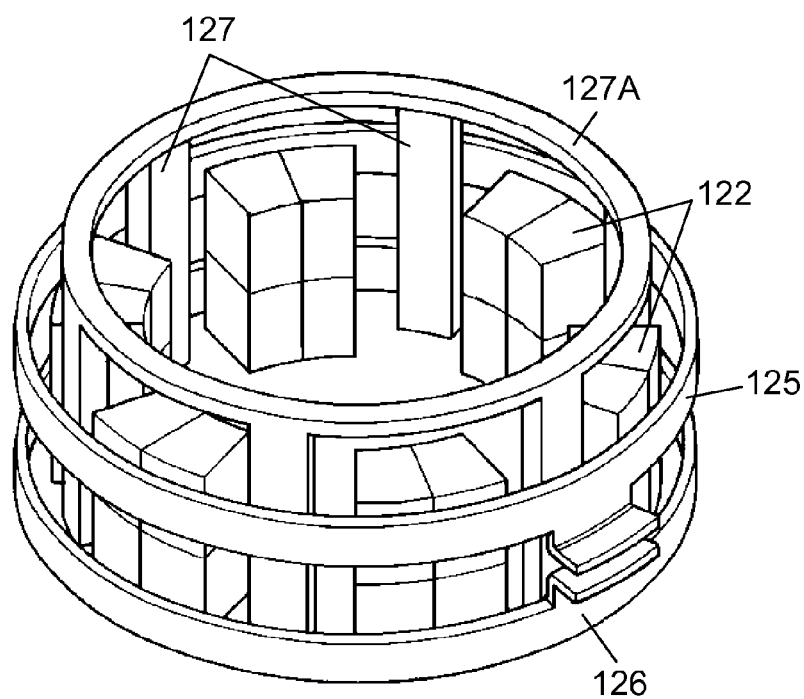
FIG. 17 shows a partial perspective view of the rotary torque detecting device according to the third embodiment of the present invention.

In this substantially arc-shaped magnet 122, different magnetic poles, i.e., a north pole and a south pole are formed to be adjacent to each other in each of vertical and lateral directions as shown in a partial perspective view in FIG. 16. Six to ten magnets 122 are arranged radially at predetermined angular intervals (e.g., at intervals of 60° in a case of six magnets) at the lower end of the outer periphery of first rotating body 121 by insert molding, adhesive bonding, or the like.

Second rotating body 124 is in a substantially cylindrical shape and made of insulating resin such as polybutylene terephthalate and first magnetic body 125 is made of a permalloy, iron, an Ni—Fe alloy, or the like. Second rotating body 124 is disposed below first rotating body 121 and first magnetic body 125 and second magnetic body 126 formed by winding substantially band-shaped plate materials into ring shapes (annular shapes) are respectively disposed above second rotating body 124 to face magnets 122.

Furthermore, third magnetic bodies 127 are made of a permalloy, iron, an Ni—Fe alloy, or the like. As shown in a partial perspective view in FIG. 17, substantially tongue-shaped multiple third magnetic bodies 127 connected by a ring-shaped frame portion 127A are arranged at predetermined angular intervals, e.g., six third magnetic bodies 127 are arranged at intervals of 60° between multiple magnets 122 and secured to an upper end of second rotating body 124.

Magnet 122 has a width corresponding to an angle of 15° to 20° and third magnetic body 127 has a width corresponding to an angle of 5° to 10°, respectively, with respect to a center of rotation of first rotating body 121. At the same time, third magnetic body 127 is about half the width of magnet 122 and an interval of an angle not smaller than 5° is provided between magnet 122 and third magnetic body 127.

Multiple wiring patterns (not shown) are formed on upper and lower surfaces of wiring board 128 made of paper phenol, glass-containing epoxy, or the like and wiring board 128 is disposed horizontally beside first rotating body 121 and second rotating body 124. On a surface facing magnets 122, magnetic detecting element 129 such as a Hall element for detecting vertical magnetism and a GMR element for detecting horizontal magnetism disposed between first magnetic body 125 and second magnetic body 126 is implemented.

On wiring board 128, control means 130 connected to magnetic detecting element 129 is formed of an electronic component such as a microcomputer. Furthermore, between first rotating body 121 and second rotating body 124, substantially columnar connecting body 31 such as a torsion bar, made of steel or the like and having an upper end secured to first rotating body 121 and retaining body 123 and a lower end secured to second rotating body 124 by pins (not shown) is provided.

In substantially box-shaped upper case 132 and lower case 133 made of insulating resin such as polybutylene terephthalate, first rotating body 121, second rotating body 124, first magnetic body 125, second magnetic body 126, wiring board 128, and the like are housed. Furthermore, upper ends of first rotating body 121 and retaining body 123 rotatably protrude through an opening hole in an upper surface of upper case 132 and a lower end of second rotating body 124 rotatably protrudes through an opening hole in a lower surface of lower case 133 to form a rotary torque detecting device.

In other words, by arranging substantially tongue-shaped multiple third magnetic bodies 127 at predetermined intervals not between magnets 122, and first magnetic body 125 and second magnetic body 126 but between multiple magnets 122, dimensions in directions of outside diameters of respective component parts such as first magnetic body 125, second magnetic body 126, and second rotating body 124 can be reduced and the entire device can be miniaturized.

This rotary torque detecting device is mounted below a steering wheel of an automobile together with a rotation angle detecting device and the like with a steering shaft attached to first rotating body 121 and second rotating body 124. At the same time, control means 130 is connected to an electronic circuit (not shown) of an automobile main body via a connector, a lead, and the like (not shown).

In the structure described above, if the steering wheel is turned, first rotating body 121 rotates. After connecting body 131 is twisted, second rotating body 124 rotates after a short lag behind first rotating body 121. At this time, however, the lag in rotation of second rotating body 124 behind first rotating body 121 is short during traveling of a vehicle, because rotary torque is small. The lag in rotation of second rotating body 124 is long during stoppage of the vehicle, because the rotary torque is large.

As first rotating body 121 rotates, multiple magnets 122 secured to it rotate, second rotating body 124 rotates as well after a short lag, and magnetic detecting element 129 detects, through first magnetic body 125 and second magnetic body 126, magnetism of magnets 122 and inputs it to control means 130.

At this time, the lag in the rotation of second rotating body 124 behind first rotating body 121 is about 1° in terms of angle when the rotary torque is small and is about 4° when the rotary torque is large. However, the intervals of the angle not smaller than 5° are provided between third magnetic bodies 127 arranged at predetermined intervals between multiple magnets 122 and respective magnets 122 and therefore third magnetic bodies 127 and magnets 122 do not come in contact with each other even when the rotary torque is large.

Figure 18A:
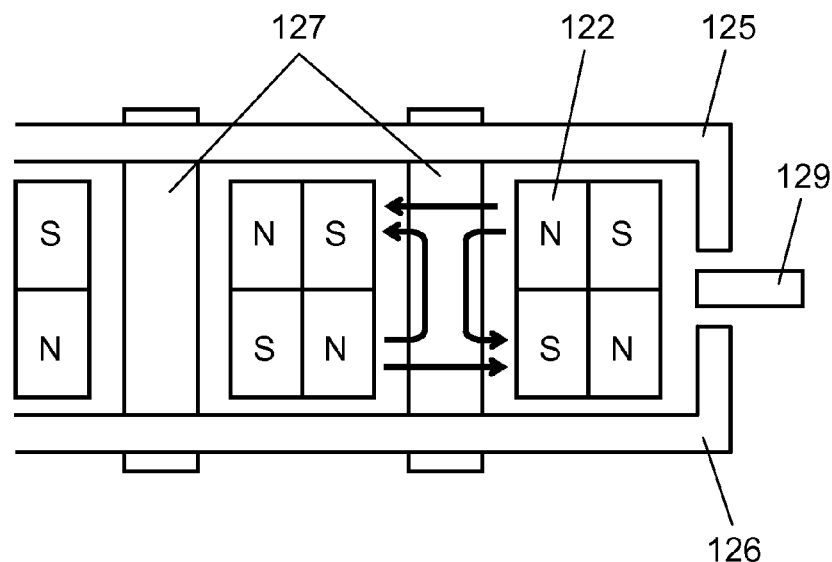
FIG. 18A shows a partial side view of the rotary torque detecting device according to the third embodiment of the present invention.

In other words, when the steering wheel is not turned and is in a neutral position and the vehicle is in a straight traveling state, a center of each of multiple third magnetic bodies 127 is at an intermediate position between multiple magnets 122 in which different magnetic poles, i.e., the north pole and the south pole are adjacent to each other in each of vertical and lateral directions and therefore magnetic forces from the north poles to the south poles are balanced, respectively, by third magnetic body 127 as shown in a partial side view in FIG. 18A, for example.

As a result, no magnetic flux is generated between first magnetic body 125 and second magnetic body 126 outside multiple magnets 122 and third magnetic bodies 127 and therefore the magnetism detected by magnetic detecting element 129 disposed therebetween is zero.

Figure 18B:
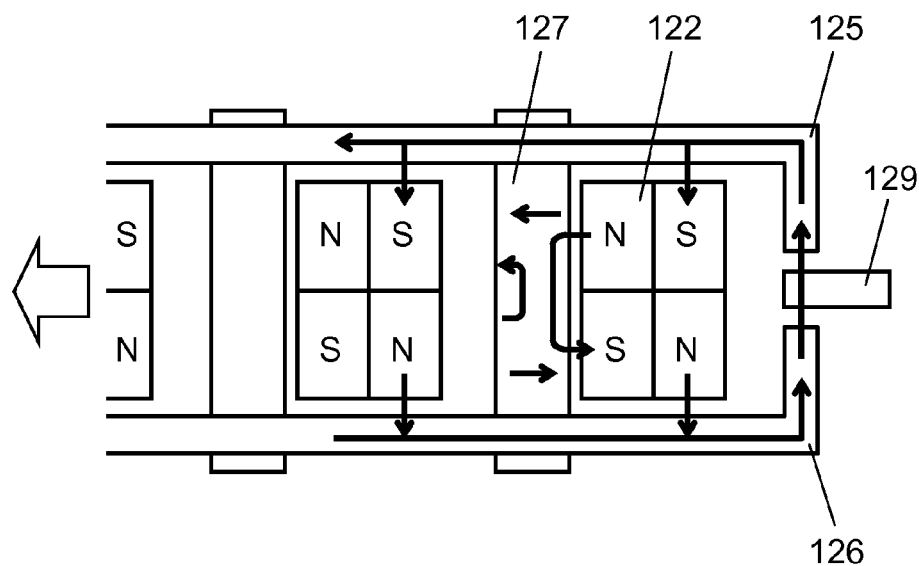
FIG. 18B shows a partial side view of the rotary torque detecting device according to the third embodiment of the present invention.
Figure 19:
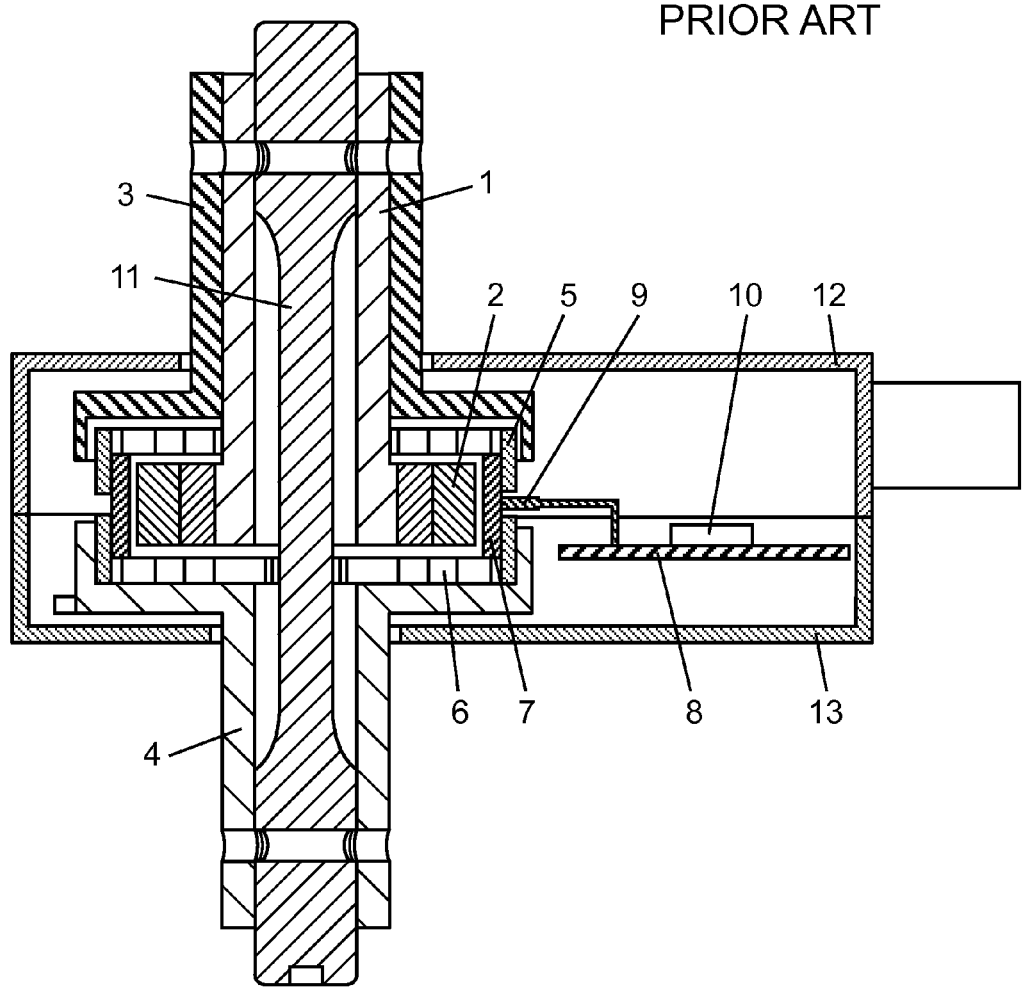
FIG. 19 shows a sectional view of a prior-art rotary torque detecting device.
Figure 20:
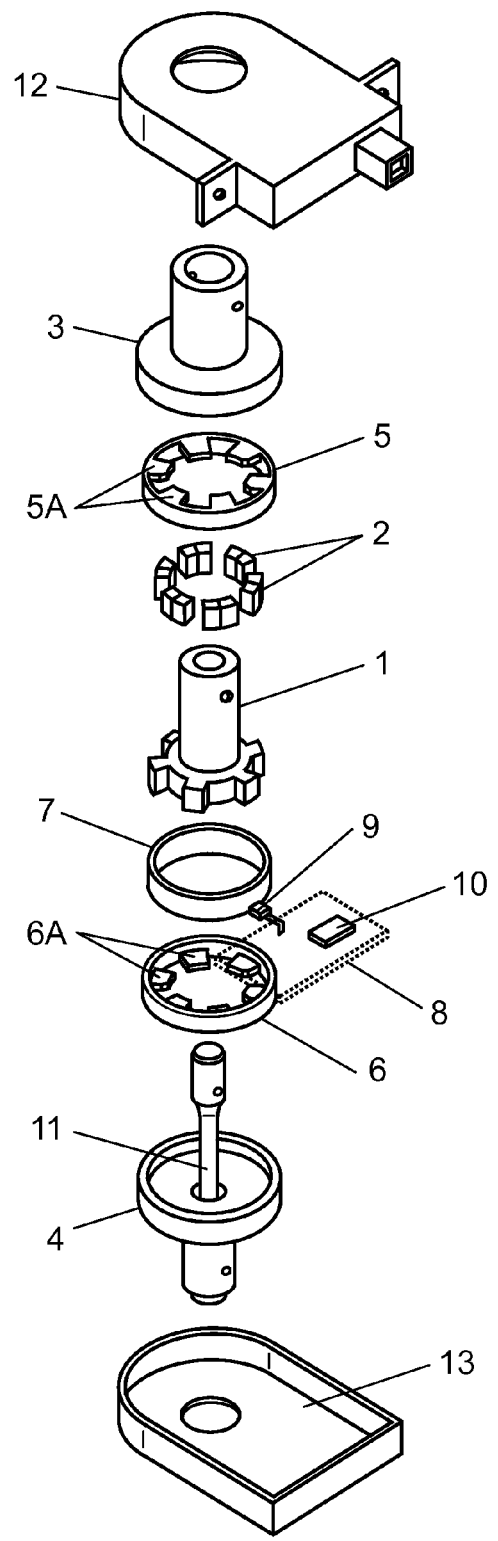
FIG. 20 shows an exploded perspective view of the prior-art rotary torque detecting device.

On the other hand, when the steering wheel is turned rightward or leftward and magnets 122 rotate when the intervals between third magnetic bodies 127 and magnets 122 become small as shown in FIG. 18B, for example, a magnetic flux which is a closed magnetic path from the north pole to the south pole is generated in third magnetic body 127 by magnet 122.

Simultaneously, a magnetic flux from the north pole to the south pole is generated in first magnetic body 125 and second magnetic body 126 by magnets 122 and magnetic detecting element 129 detects the magnetism and outputs voltage corresponding to an intensity of the magnetism to control means 130.

At this time, the magnetism detected by magnetic detecting element 129 is weak when the lag in the rotation of second rotating body 124, to which third magnetic bodies 127 are secured, behind first rotating body 121, to which magnets 122 are secured, is short because the intervals between third magnetic bodies 127 and magnets 122 are large and is strong when the lag in the rotation is long because the intervals are small.

Then, control means 130 calculates the rotary torque of the steering shaft based on the intensity of the magnetism detected by magnetic detecting element 129 through first magnetic body 125, second magnetic body 126, and third magnetic bodies 127 and outputs it to the electronic circuit of the automobile main body. The electronic circuit computes the rotary torque, the rotation angle of the steering member, or various data from speed sensors and the like attached to respective portions of a vehicle body to carry out various controls of the vehicle such as controls of a power steering device and a brake device.

In other words, adjusting to a state of traveling or stoppage of the vehicle, if the vehicle is traveling and the rotary torque of the steering member is small, for example, effect of the power steering device is reduced and the steering wheel is turned with some degree of strong force. On the other hand, during stoppage of the vehicle when the rotary torque of the steering member is large, the effect of the power steering device is enhanced so that the steering wheel can be turned with small force.

As described above, by arranging substantially tongue-shaped multiple third magnetic bodies 127 at predetermined intervals between multiple magnets 122, dimensions in directions of outside diameters of respective component parts such as first magnetic body 125, second magnetic body 126, and second rotating body 124 can be reduced and therefore the entire device can be miniaturized.

In other words, by arranging substantially tongue-shaped multiple third magnetic bodies 127 at predetermined intervals not between magnets 122, and first magnetic body 125 and second magnetic body 126 but between multiple magnets 122, a part or the like for retaining third magnetic bodies 127 becomes unnecessary and a lack of thickness of such part makes the simple structure and miniaturization of the entire device possible.

Furthermore, because magnetic detecting element 129 detects the magnetism of magnets 122 through first magnetic body 125, second magnetic body 126, and third magnetic bodies 127 and control means 130 detects the rotary torque based on this detection, it is possible to reliably detect the rotary torque.

Although multiple third magnetic bodies 127 are arranged while connected by ring-shaped frame portion 127A in the structure described in the above description, the present invention can be carried out, if multiple substantially tongue-shaped third magnetic bodies 127 are secured at predetermined angular intervals to an upper end of second rotating body 124 and are arranged between multiple magnets 122.

In the structure described in the above description, one magnetic detecting element 129 is disposed between first magnetic body 125 and second magnetic body 126. However, by providing multiple, e.g., two magnetic detecting elements 129 and detecting the magnetism of magnets 122 with multiple magnetic detecting elements 129, the rotary torque can be detected in the event of breakage or failure of one of magnetic detecting elements 129. If control means 130 carries out comparison of the magnetism detected by magnetic detecting elements 129, it is possible to detect such breakage and failure.

As described above, according to the third embodiment of the present invention, by arranging substantially tongue-shaped multiple third magnetic bodies 127 at predetermined intervals between multiple magnets 122, third magnetic bodies 127 are provided between multiple magnets 122. Therefore, dimensions in a direction of an outside diameter can be reduced and the entire device can be miniaturized with a simple structure. Furthermore, by detecting the magnetism of magnets 122 through third magnetic bodies 127, first magnetic body 125, and second magnetic body 126, it is possible to obtain the rotary torque detecting device that can reliably detect the rotary torque.

What is claimed is:

1. A rotary torque detecting device comprising:
   a first rotating body for rotating about a rotary axis in synchronization with a steering member;
   a magnet secured to the first rotating body;
   a second rotating body disposed axially below the first rotating body;
   a first magnetic body disposed radially outwardly of the magnet so as to face radially inwardly toward an outer periphery of the magnet;
   a second magnetic body disposed axially below the first magnetic body and radially outwardly of the magnet so as to face radially inwardly toward the outer periphery of the magnet;
   a connecting body having an upper end secured to the first rotating body and a lower end secured to the second rotating body;
   third magnetic body arranged radially outwardly of the magnet and radially inwardly of the first and second magnetic bodies; and
   a magnetic detecting element disposed axially between the first magnetic body and the second magnetic body;
   wherein the third magnetic body is rotatably displaceable relative to the magnet upon rotation of the first rotating body to cause the magnet to generate magnetic flux in the first, second and third magnetic bodies; and
   wherein the magnetic detecting element is configured for detecting the magnetic flux generated in the first, second and third magnetic bodies, in order to allow for detection of torque between the first and second rotating bodies.

2. The rotary torque detecting device according to claim 1, wherein the third magnetic body is formed to protrude, in at least one axial direction, axially beyond the magnet.

3. The rotary torque detecting device according to claim 1, wherein
   the first, second and third magnetic bodies are secured to the second rotating body.

4. The rotary torque detecting device according to claim 1, wherein
   the magnet is one of a plurality of magnets secured to the first rotating body.

5. The rotary torque detecting device according to claim 4, wherein
   the magnets are disposed on a same circle about the rotary axis.

6. The rotary torque detecting device according to claim 4, wherein
   the third magnetic body is one of a plurality of third magnetic bodies disposed circumferentially about the rotary axis.

7. The rotary torque detecting device according to claim 6, wherein
   the third magnetic bodies are spaced apart circumferentially at intervals about the rotary axis.

8. The rotary torque detecting device according to claim 4, wherein
   the first magnetic body is a first annular magnetic body; and
   the second magnetic body is a second annular magnetic body.

9. The rotary torque detecting device according to claim 4, wherein
   the first, second and third magnetic bodies are secured to the second rotating body.

10. The rotary torque detecting device according to claim 1, wherein
    the third magnetic body is one of a plurality of third magnetic bodies disposed circumferentially about the rotary axis.

11. The rotary torque detecting device according to claim 10, wherein
    the third magnetic bodies are spaced apart circumferentially at intervals about the rotary axis.

12. The rotary torque detecting device according to claim 1, wherein
    the first magnetic body is a first annular magnetic body; and
    the second magnetic body is a second annular magnetic body.

13. A rotary torque detecting device comprising:
    a first rotating body for rotating about a rotary axis in synchronization with a steering member;
    a plurality of magnets secured to the first rotating body so as to be circumferentially spaced apart by intervals about the rotary axis;

a second rotating body disposed axially below the first rotating body;

a first magnetic body disposed radially outwardly of the magnets so as to face radially inwardly toward an outer periphery of the magnets;

a second magnetic body disposed axially below the first magnetic body and radially outwardly of the magnets so as to face radially inwardly toward the outer periphery of the magnets;

a connecting body having an upper end secured to the first rotating body and a lower end secured to the second rotating body;

a plurality of third magnetic bodies respectively arranged in the intervals circumferentially between the magnets and radially inwardly of the first and second magnetic bodies; and a magnetic detecting element disposed axially between the first magnetic body and the second magnetic body;

wherein the third magnetic bodies are rotatably displaceable relative to the magnets upon rotation of the first rotating body to cause the magnets to generate magnetic flux in the first, second and third magnetic bodies; and wherein the magnetic detecting element is configured for detecting the magnetic flux generated in the first, second and third magnetic bodies, in order to allow for detection of torque between the first and second rotating bodies.

14. The rotary torque detecting device according to claim 13, wherein the third magnetic bodies are connected together by an annular frame.

15. The rotary torque detecting device according to claim 14, wherein the first magnetic body is a first annular magnetic body; and the second magnetic body is a second annular magnetic body.

16. The rotary torque detecting device according to claim 13, wherein the first magnetic body is a first annular magnetic body; and the second magnetic body is a second annular magnetic body.

* * * * *